(12) United States Patent
Kataoka et al.

(10) Patent No.: US 11,120,222 B2
(45) Date of Patent: Sep. 14, 2021

(54) NON-TRANSITORY COMPUTER READABLE RECORDING MEDIUM, IDENTIFICATION METHOD, GENERATION METHOD, AND INFORMATION PROCESSING DEVICE

(71) Applicant: FUJITSU LIMITED, Kawasaki (JP)

(72) Inventors: Masahiro Kataoka, Kamakura (JP); Seiji Okura, Setagaya (JP); Masao Ideuchi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 16/364,486

(22) Filed: Mar. 26, 2019

(65) Prior Publication Data
US 2019/0317990 A1    Oct. 17, 2019

(30) Foreign Application Priority Data
Apr. 12, 2018  (JP) ............................. JP2018-077144

(51) Int. Cl.
*G06F 40/284* (2020.01)
*G06F 16/31* (2019.01)
*G06F 40/30* (2020.01)
*G06F 40/211* (2020.01)
*G06F 40/268* (2020.01)

(52) U.S. Cl.
CPC .......... *G06F 40/284* (2020.01); *G06F 16/325* (2019.01); *G06F 40/211* (2020.01); *G06F 40/268* (2020.01); *G06F 40/30* (2020.01)

(58) Field of Classification Search
CPC ...... G06F 16/951; G06F 40/103; G06F 40/30; G06F 40/20; G06F 16/313; G06F 16/345; G06F 40/242

USPC .......................................................... 704/1
See application file for complete search history.

(56) References Cited

U.S. PATENT DOCUMENTS

| | | | |
|---|---|---|---|
| 4,959,769 A | * | 9/1990 | Cooper ................. G06F 40/123 |
| 2005/0210056 A1 | * | 9/2005 | Pomerantz ............. G06F 16/10 |
| 2009/0089277 A1 | | 4/2009 | Cheslow |

(Continued)

FOREIGN PATENT DOCUMENTS

| | | | |
|---|---|---|---|
| BG | 66265 B1 | * 10/2012 | .......... G06F 40/103 |
| JP | 9-212523 A | 8/1997 | |

(Continued)

OTHER PUBLICATIONS

Y. Sagisaka and H. Sato, "Word identification method for Japanese text-to-speech conversion system," ICASSP '86. IEEE International Conference on Acoustics, Speech, and Signal Processing, 1986, pp. 2411-2414, doi: 10.1109/ICASSP.1986.1169262. (Year: 1986).*

*Primary Examiner* — Bharatkumar S Shah
(74) *Attorney, Agent, or Firm* — Westerman, Hattori, Daniels & Adrian, LLP

(57) ABSTRACT

An information processing device receives a specification of a word, and specifies an appearance position associated with the specified word by referring to information in which appearance positions in text data of respective words included in the text data are associated with each of the words. The information processing device specifies an attribute associated with the specified appearance position by referring to information in which attributes at respective appearance positions in the text data of respective words included in the text data are associated with the appearance positions.

14 Claims, 11 Drawing Sheets

(56) References Cited

U.S. PATENT DOCUMENTS

| | | | |
|---|---|---|---|
| 2011/0167064 A1* | 7/2011 | Achtermann | G06F 16/951 |
| | | | 707/737 |
| 2017/0147546 A1* | 5/2017 | Ishii | G06F 40/166 |
| 2017/0300507 A1 | 10/2017 | Kataoka et al. | |
| 2017/0372695 A1* | 12/2017 | Takei | G10L 15/187 |
| 2018/0034824 A1* | 2/2018 | Maycotte | G06F 21/6218 |
| 2019/0026324 A1* | 1/2019 | Sato | G06F 16/285 |

FOREIGN PATENT DOCUMENTS

| | | |
|---|---|---|
| JP | 2009-87347 A | 4/2009 |
| JP | 2017-194762 A | 10/2017 |

* cited by examiner

FIG.6A

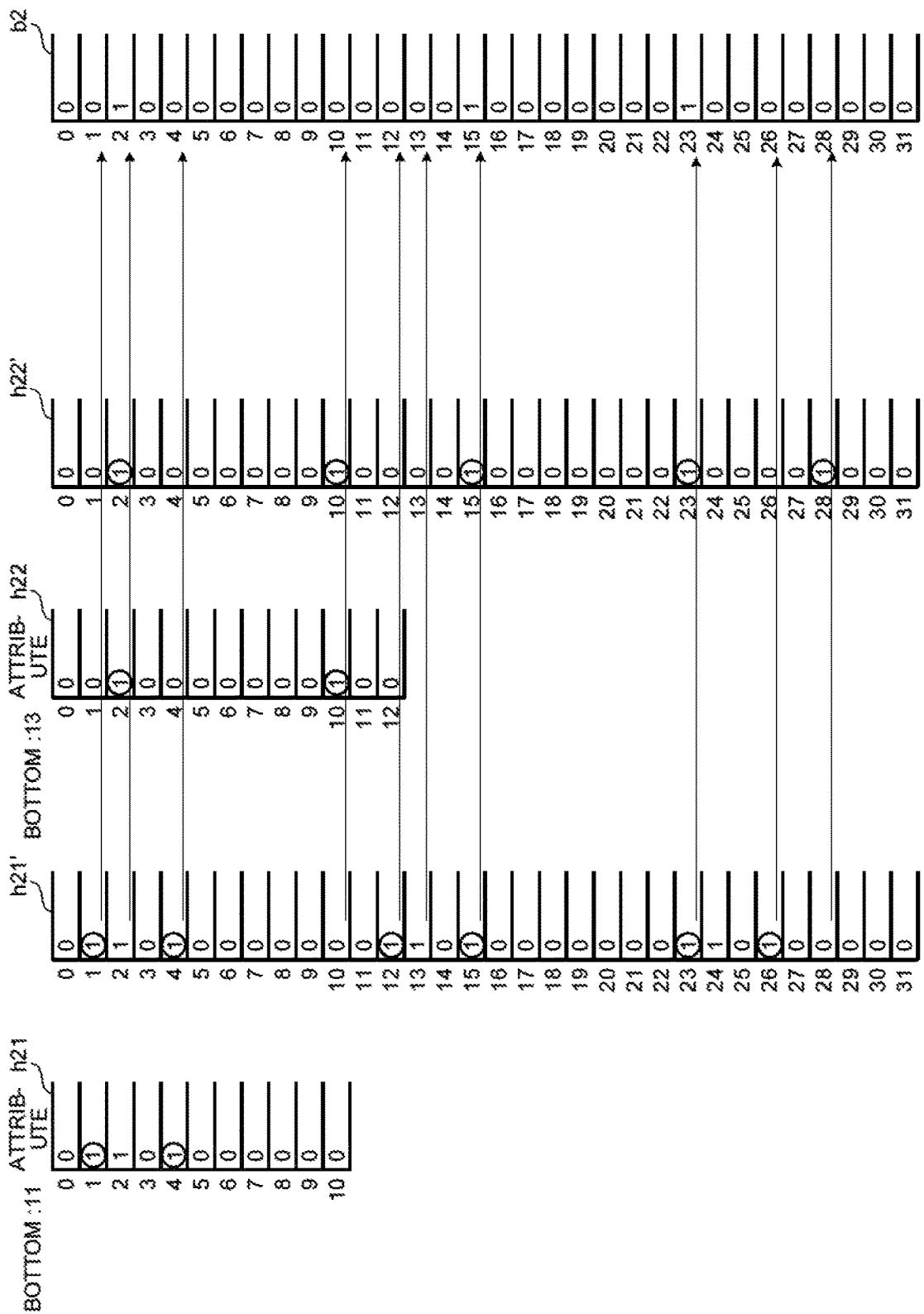

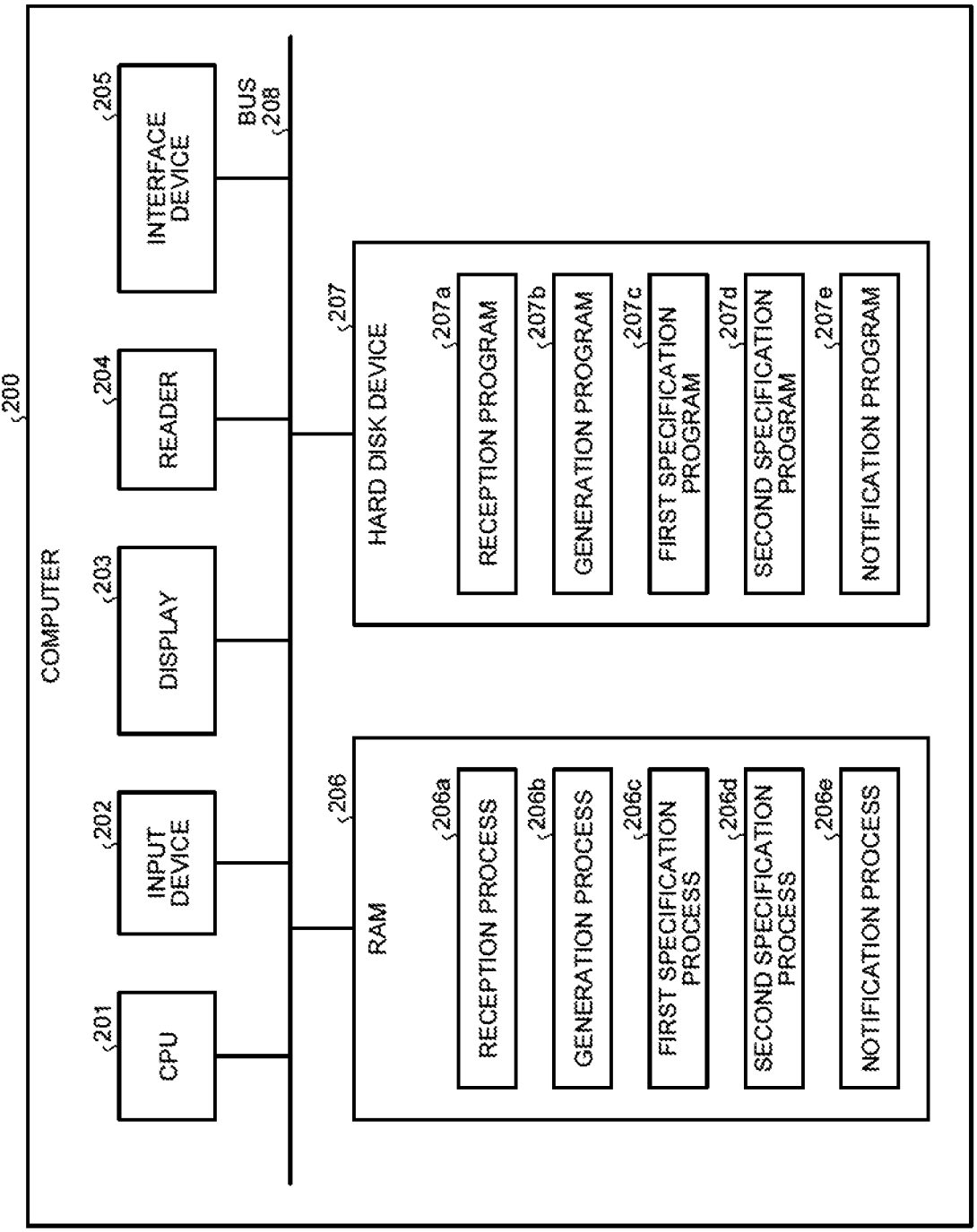

NON-TRANSITORY COMPUTER READABLE RECORDING MEDIUM, IDENTIFICATION METHOD, GENERATION METHOD, AND INFORMATION PROCESSING DEVICE

CROSS-REFERENCE TO RELATED APPLICATION(S)

This application is based upon and claims the benefit of priority of the prior Japanese Patent Application No. 2018-077144, filed on Apr. 12, 2018, the entire contents of which are incorporated herein by reference.

FIELD

The embodiments discussed herein are related to a computer-readable recording medium.

BACKGROUND

Conventionally, in addition to a morpheme analysis, a syntax analysis and a semantic analysis are performed with respect to text data, and attributes such as subject (S), verb (V), object (O), complement (C), and dependency between words are specified with respect to respective words included in the text data, and these attributes are used in the subsequent processing. For example, in conventional techniques, when a word included in text data is to be compressed into a word code, the word and an attribute are associated with each other by performing the semantic analysis described above and storing the attribute corresponding to the word in a part of the word code. These related-art examples are described, for example, in Japanese Laid-open Patent Publication No. 2009-087347, Japanese Laid-open Patent Publication No. Hei9-212523 and Japanese Laid-open Patent Publication No. 2017-194762.

SUMMARY

According to an aspect of an embodiment, an identification method includes receiving a specification of a word; specifying an appearance position associated with the specified word by referring to information in which appearance positions in text data of respective words included in the text data are associated with each of the words; and specifying an attribute associated with the specified appearance position by referring to information in which attributes at respective appearance positions in the text data of respective words included in the text data are associated with the appearance positions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is an explanatory diagram of an example of a process of restoring the first index;

FIG. 6B is an explanatory diagram of an example of a process of restoring the second index;

FIG. 9 is a diagram illustrating an example of a hardware configuration of a computer that realizes functions identical to those of the information processing device.

DESCRIPTION OF EMBODIMENT(S)

However, in the conventional techniques described above, there is a problem that the attribute of a word included in text data is not specified at a high speed.

Preferred embodiments of the present invention will be explained with reference to accompanying drawings. The present invention is not limited to the embodiments.

Figure 1:
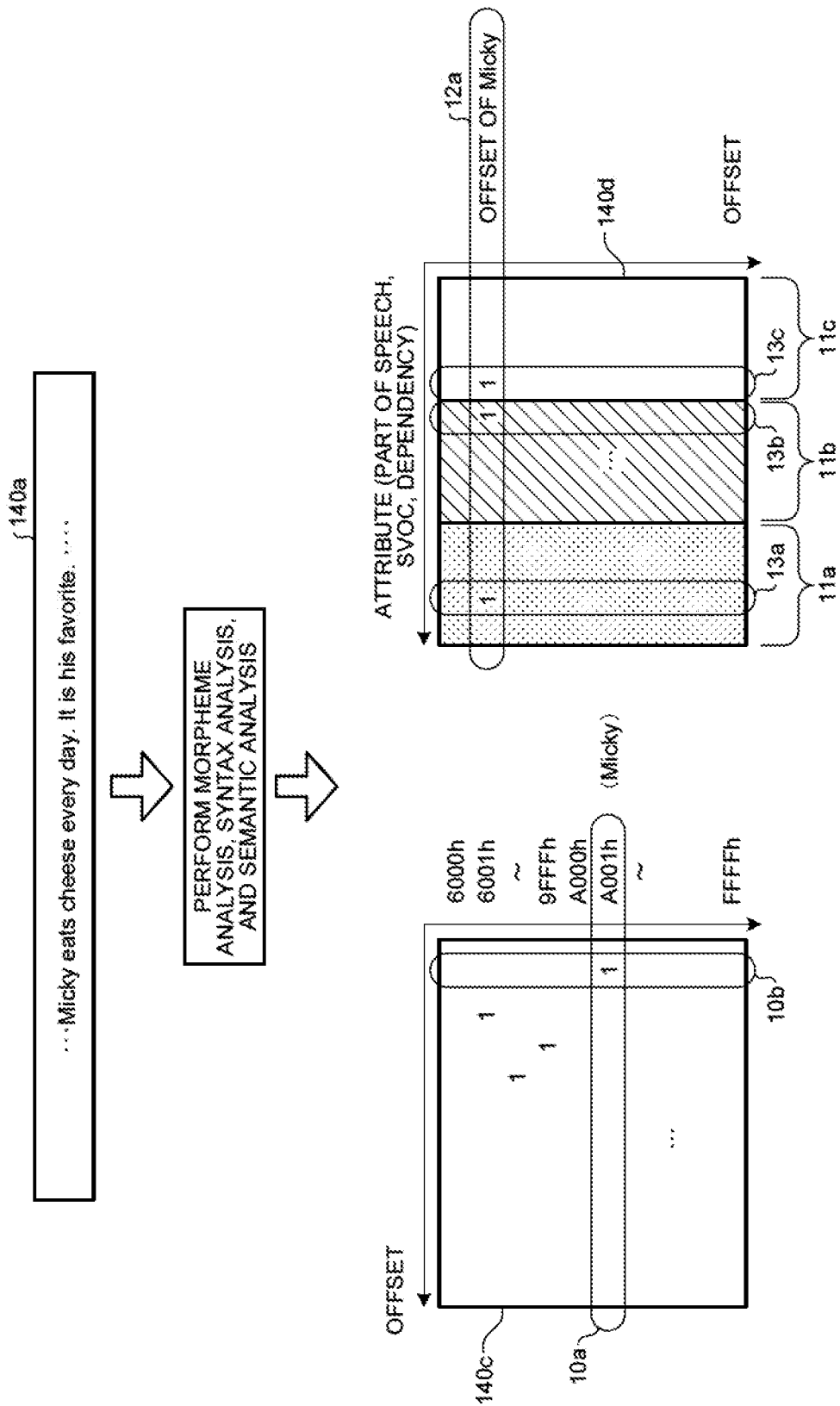
FIG. 1 is an explanatory diagram (1) of an example of processes executed by an information processing device according to an embodiment of the present invention.
Figure 2:
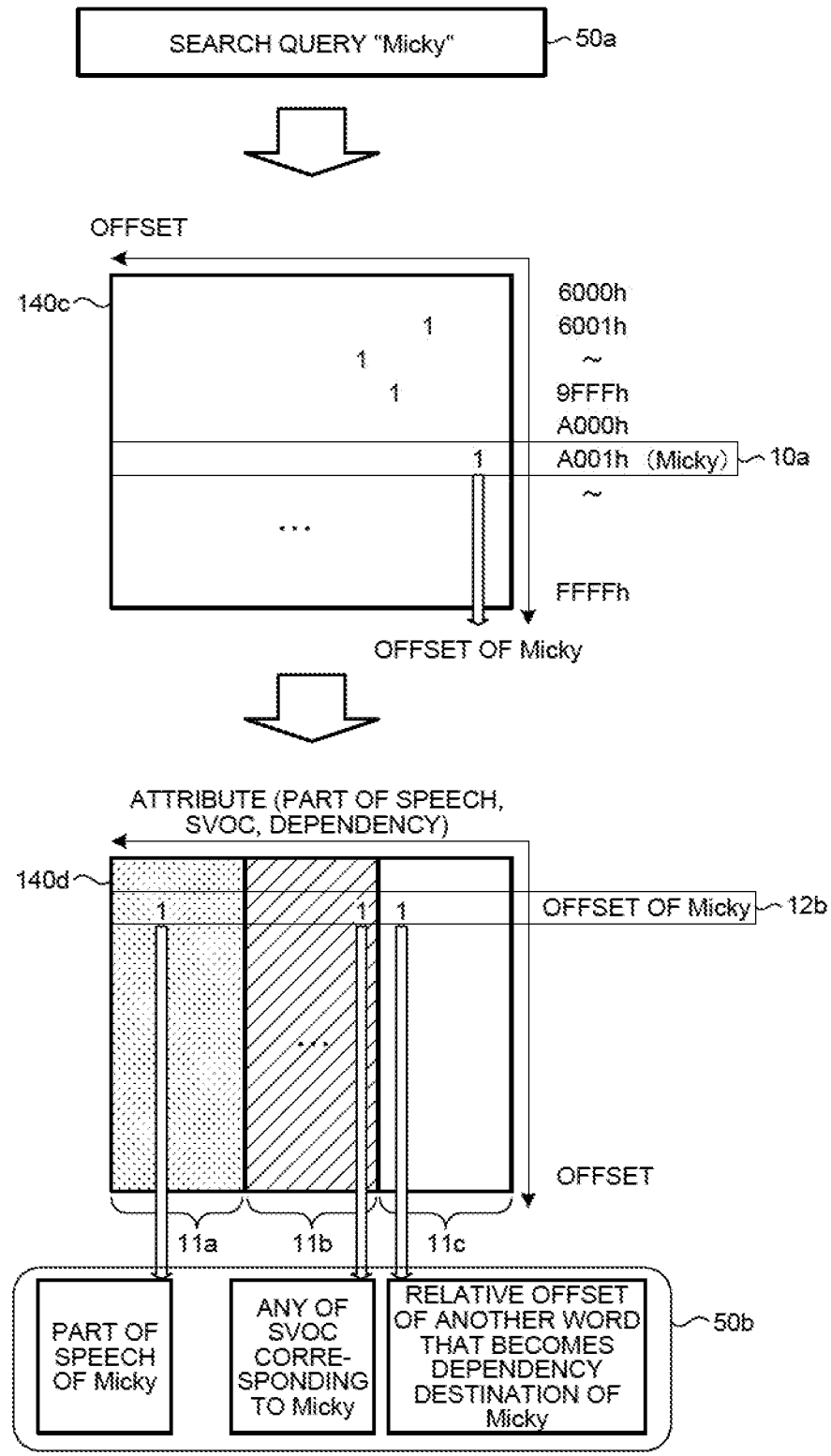
FIG. 2 is an explanatory diagram (2) of an example of processes executed by the information processing device according to the embodiment.

FIG. 1 and FIG. 2 are explanatory diagrams of an example of processes executed by an information processing device according to an embodiment of the present invention. As illustrated in FIG. 1, the information processing device generates a first index 140*c* and a second index 140*d* based on text data 140*a*.

The text data 140*a* is information of a sentence including a plurality of words. For example, the text data 140*a* illustrated in FIG. 1 includes " . . . Micky eats cheese every day. It is his favorite . . . ". The text data 140*a* illustrated in FIG. 1 is only an example and can be also information of another sentence.

The information processing device performs a lexical analysis with respect to the text data 140*a* to specify the "attribute" of a word for respective words included in the text data 140*a*. The attribute of words includes "part of speech of words", "SVOC of words", and "dependency of words". The part of speech of words includes a noun, a pronoun, an adjective, a verb, an adverb, a preposition, a conjunction, an interjection, and the like.

The SVOC of words is a sign for distinguishing elements of respective words included in a sentence. S is a sign indicating a subject of a sentence. V is a sign indicating a verb of the sentence. O is a sign indicating an object of the verb of the sentence. C is a sign indicating a complement of the sentence.

For example, in the sentence "Micky eats cheese every day" in the text data 140*a*, the subject (S) is "Micky", the verb (V) is "eats", and the object (O) is "cheese". In the sentence "It is his favorite" in the text data 140*a*, the subject (S) is "It", the verb (V) is "is", and the complement (C) is "favorite".

The dependency of words is explained. The dependency of words is defined by a word as a dependency source and a word as a dependency destination. As an example in the present embodiment, a word being the "subject" included in the sentence is designated as a word at the dependency source and a word corresponding to the "object" is designated as a word at the dependency destination. For example, in the sentence "Micky eats cheese every day" in the text data 140a, the word at the dependency destination of the word "Micky" is "cheese".

The information processing device generates the first index 140c and the second index 140d based on results of a morpheme analysis, a syntax analysis, and a semantic analysis of the text data 140a.

The first index 140c is information in which a word included in the text data 140a is associated with an offset of the word. Although explanations thereof are omitted here, it is assumed that the information processing device converts (compresses) a word into a word ID by using dictionary information. The offset is an offset starting from a top word included in the text data 140a. For example, when the sentence "Micky eats cheese every day" is a first sentence in the text data 140a, "Micky" is the top word. Therefore, offsets of "Micky", "eats", "cheese", "every", and "day" become "1", "2", "3", "4" and "5", respectively.

The horizontal axis of the first index 140c is an axis corresponding to the offset. The vertical axis of the first index 140c is an axis corresponding to a word ID (word). The information processing device sets a flag "1" at the position of the corresponding index in each word ID. For example, when "Micky" is located in the offset "1" of the text data 140a, the information processing device sets a flag "1" at a position at which a row 10a of a word ID "A001h" of the word "Micky" intersects with a column 10b of the offset "1". The information processing device generates the first index 140c by repeatedly executing the process of setting the flag "1" at a corresponding position for other words in a similar manner.

The second index 140d is information in which the offset of a word included in the text data 140a is associated with the attribute of the word. The horizontal axis of the second index 140d is an axis corresponding to the attribute of words. The attribute of words includes "part of speech of words", "SVOC of words", and "dependency of words". The vertical axis of the second index 140d is an axis corresponding to the offset of words.

The horizontal axis of the attribute is separated into a portion 11a corresponding to the part of speech of words, a portion 11b corresponding to the SVOC of words, and a portion 11c corresponding to the dependency of words. In the portion 11a corresponding to the part of speech of words, there are columns corresponding to "noun, pronoun, adjective, verb, adverb, preposition, conjunction, and interjection". For example, in the offset "1" of the text data 140a, there is a word "Micky" as the part of speech "noun". Therefore, the information processing device sets a flag "1" at a position at which a row 12a of the offset "1" of the second index 140d intersects with a column 13a corresponding to the part of speech "noun".

In the portion 11b corresponding to the SVOC of words, there are columns corresponding to "S, V, O, C". For example, in the offset "1" of the text data 140a, there is the word "Micky" as the subject "S". Therefore, the information processing device sets a flag "1" at a position at which the row 12a of the offset "1" of the second index 140d intersects with a column 13b corresponding to the subject "S".

In the portion 11c corresponding to the dependency of words, there are columns corresponding to relative offsets "1, 2, 3, 4, . . . , n". The relative offsets indicate offsets from a word at the dependence source to a word at the dependency destination. For example, in the sentence "Micky eats cheese every day" in the text data 140a, when it is assumed that the word at the dependence source is "Micky (offset "1") and the word at the dependency destination is "cheese", the relative offset becomes "2". Therefore, the information processing device sets a flag "1" at a position at which the row 12a of the offset "1" of the second index 140d intersects with a column 13c corresponding to the relative offset "2".

The information processing device generates the second index 140d by repeatedly executing the process of setting the flag "1" at the corresponding position also for the offsets of other words in a similar manner.

FIG. 2 is described next. Upon reception of a specification of a word by a search query 50a, the information processing device specifies the attribute of the specified word by using the first index 140c and the second index 140d in a stepwise manner.

For example, a case where a word "Micky" (word ID: A001h) is received by a search query 50a is described. The information processing device scans the row 10a of the word ID "A001h" corresponding to the word "Micky" on the first index 140c, and specifies a location where the flag "1" is set. The information processing device specifies an offset corresponding to the location where the flag "1" is set as the offset of the word "Micky".

Subsequently, the information processing device compares the offset of the word "Micky" specified by using the first index 140c with the second index 140d to specify attribute information 50b of the word "Micky". As described later, the attribute information 50b includes information related to the part of speech, SVOC, and dependency.

The information processing device scans a row 12a corresponding to the offset of the word "Micky" on the second index 140d. When there is a location where the flag "1" is set in the portion 11a corresponding to the part of speech of words, the information processing device specifies a part of speech corresponding to a column where the flag "1" is set as the part of speech corresponding to the word "Micky".

When there is a location where the flag "1" is set in the portion 11b corresponding to the SVOC of words, the information processing device specifies any of "S, V, O, C" corresponding to the column where the flag "1" is set as the SVOC corresponding to the word "Micky".

When there is a location where the flag "1" is set in the portion 11c corresponding to the dependency of words, the information processing device specifies a relative offset corresponding to the row where the flag "1" is set. This relative offset is a relative offset of another word that becomes the dependency destination of "Micky".

As described above, when the search query 50a is received, the information processing device uses the first index 140c to specify an offset on the text data 140a corresponding to the specified word. The information processing device compares the specified offset with the second index 140d to specify the attribute information 50b corresponding to the word specified in the search query 50a. Accordingly, the attribute of words included in text data can be easily specified only by specifying a search query.

Figure 3:
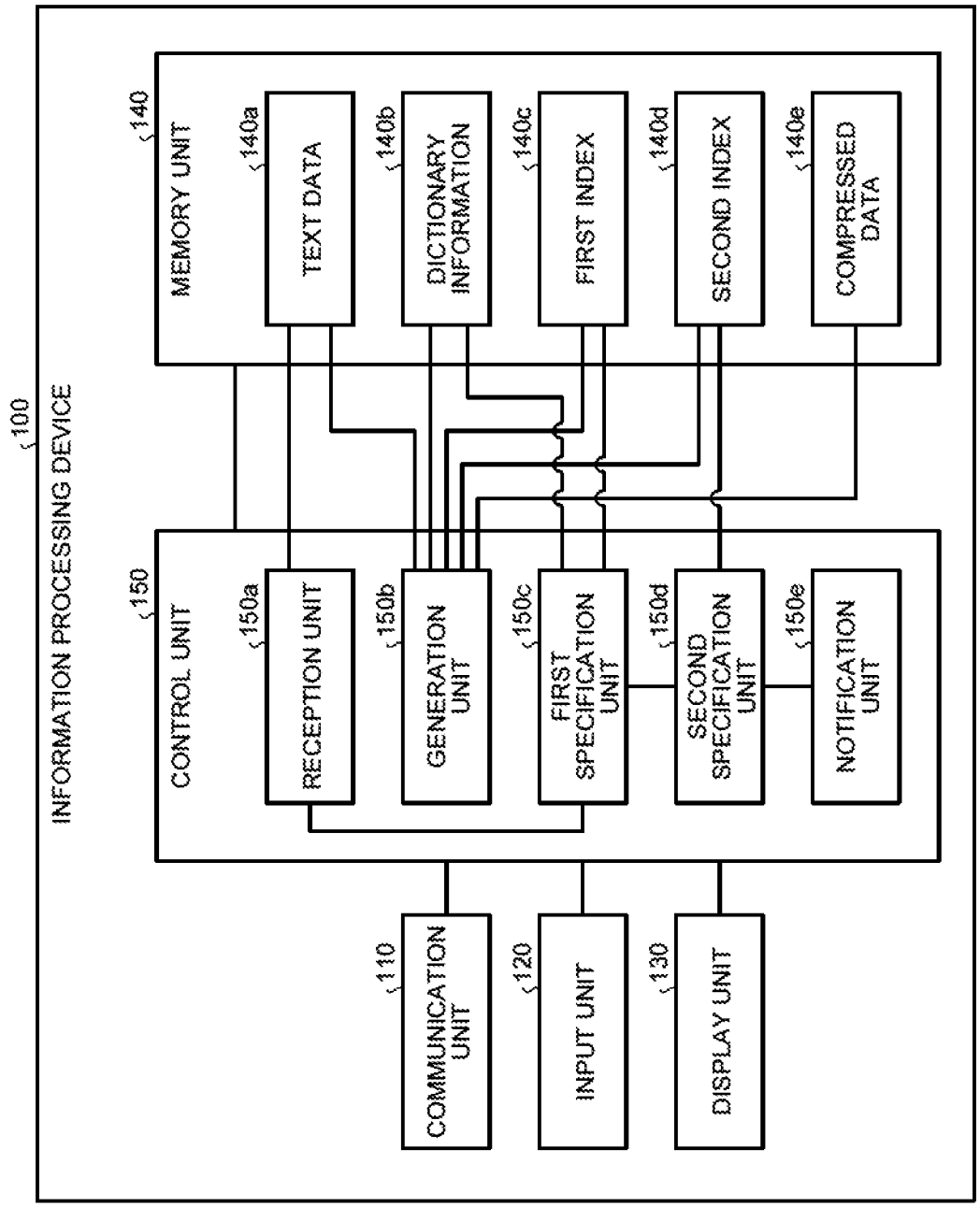
FIG. 3 is a functional block diagram illustrating a configuration of the information processing device according to the embodiment.

Next, the configuration of the information processing device described with reference to FIG. 1 and FIG. 2 is described. FIG. 3 is a functional block diagram illustrating a configuration of the information processing device according to the present embodiment. As illustrated in FIG. 3, an information processing device 100 includes a communication unit 110, an input unit 120, a display unit 130, a memory unit 140, and a control unit 150.

The communication unit 110 is a processing unit that performs data communication with other external devices via a network or the like. The communication unit 110 corresponds to a communication device or the like. For example, the information processing device 100 can receive the text data 140a and information of a search query by performing data communication with a terminal device used by a user.

The input unit 120 is an input device for inputting various types of information to the information processing device 100. The input unit 120 corresponds to a keyboard, a mouse, a touch panel, and the like. For example, a user can specify a word that becomes a search query by operating the input unit 120.

The display unit 130 is a display device that displays various types of information output from the control unit 150. The display unit 130 corresponds to a liquid-crystal display, a touch panel, or the like. For example, the display unit 130 can display thereon attribute information of a word specified by a search query and information related to the attribute information.

The memory unit 140 includes the text data 140a, dictionary information 140b, the first index 140c, the second index 140d, and compressed data 140e. The memory unit 140 corresponds to a RAM (Random Access Memory), a ROM (Read Only Memory), a semiconductor memory device such as a flash memory, and a memory device such as an HDD (Hard Disk Drive).

The text data 140a is information of a sentence including a plurality of words. For example, the text data 140a illustrated in FIG. 1 includes " . . . Micky eats cheese every day. It is his favorite . . . ".

The dictionary information 140b is data holding information of a static dictionary and a dynamic dictionary. The static dictionary is data associating words with static codes. When a unique dynamic code is allocated to a word that does not exist in the static dictionary, the dynamic dictionary holds data associating the word with a dynamic code. In the present embodiment, as an example, the static code and the dynamic code are denoted as "word ID".

The first index 140c is information in which a word ID of words included in the text data 140a is associated with an offset of words. The data structure of the first index 140c corresponds to the first index 140c illustrated in FIG. 1 and FIG. 2. The horizontal axis of the first index 140c is an axis corresponding to the offset. The vertical axis of the first index 140c is an axis corresponding to the word ID (word). In the first index 140c, a word ID of a word is associated with an offset of the word by setting the flag "1".

The second index 140d is information in which an offset of words included in the text data 140a is associated with an attribute of words. The data structure of the second index 140d corresponds to the second index 140d illustrated in FIG. 1 and FIG. 2. The vertical axis of the second index 140d is an axis corresponding to an offset of words. The horizontal axis of the second index 140d is an axis corresponding to the attribute. The attribute of words includes the "part of speech of words", "SVOC of words", and "dependency of words".

Figure 4:
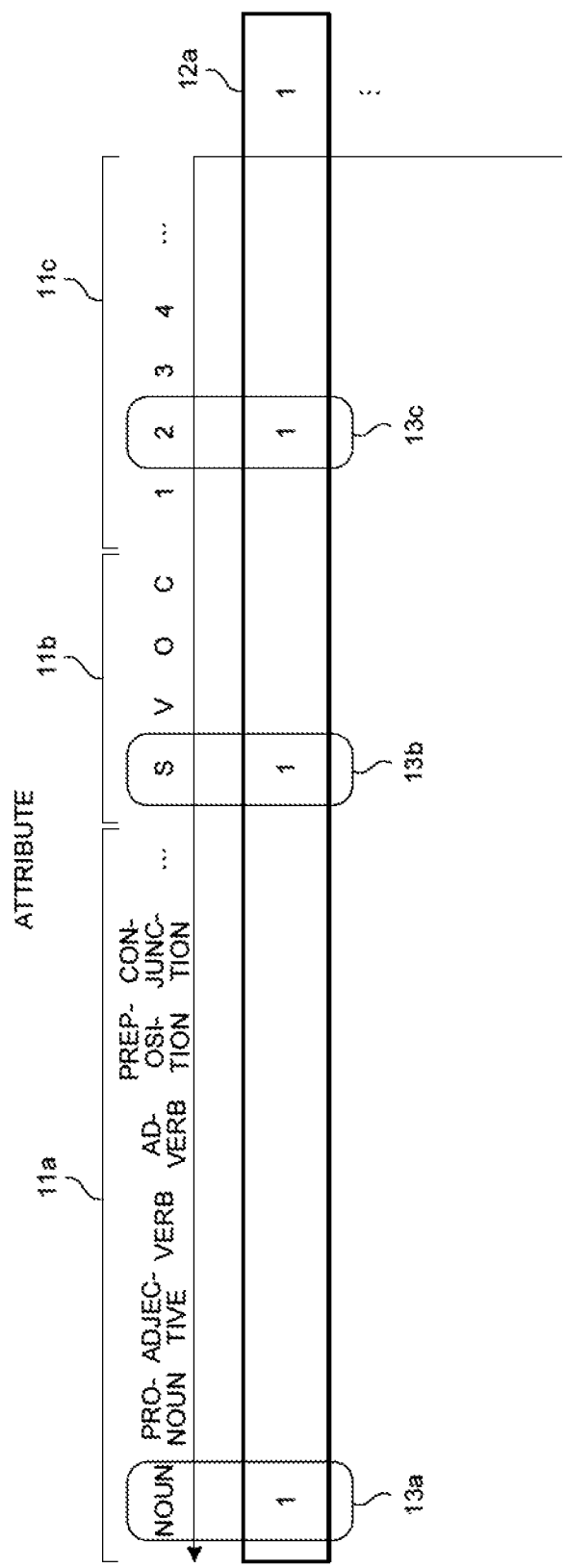
FIG. 4 is a diagram illustrating an example of an attribute arranged on a horizontal axis of a second index.

FIG. 4 is a diagram illustrating an example of an attribute arranged on the horizontal axis of the second index. As illustrated in FIG. 4, the attribute corresponding to the horizontal axis is divided into the portion 11a corresponding to the part of speech of words, the portion 11b corresponding to the SVOC of words, and the portion 11c corresponding to the dependency of words.

In the portion 11a corresponding to the part of speech of words, a noun, a pronoun, an adjective, a verb, an adverb, a preposition, a conjunction, and the like are set. For example, when "Micky" is present in "1" in the text data 1a40a and "Micky" in the offset 1 is a noun, a flag "1" is set at a position at which a row 12a of the offset "1" intersects with a column 13a corresponding to the "noun" of the part of speech.

In the portion 11b corresponding to the SVOC of words, there are columns corresponding to "S, V, O, C". For example, a word "Micky" being a subject (S) is present in the offset "1" in the text data 140a. Therefore, the information processing device sets a flag "1" at a position at which the row 12a of the offset "1" in the second index 140d intersects with a column 13b corresponding to the subject (S).

In the portion 11c corresponding to the dependency of words, columns corresponding to the relative offsets "1, 2, 3, 4, . . . , n" are present. For example, in the sentence "Micky eats cheese every day" in the text data 140a, when it is assumed that the word at the dependency source is "Micky (offset "1")" and the word at the dependency destination is "cheese", the relative offset becomes "2". Therefore, the information processing device sets a flag "1" at a position at which the row 12a of the offset "1" in the second index 140d intersects with a column 13c corresponding to the relative offset "2".

The compressed data 140e is data obtained by compressing the text data 140a based on the dictionary information 140b.

The explanation returns to FIG. 3. The control unit 150 includes a reception unit 150a, a generation unit 150b, a first specification unit 150c, a second specification unit 150d, and a notification unit 150e. The control unit 150 can be realized by a CPU (Central Processing Unit) or an MPU (Micro Processing Unit). The control unit 150 can be also realized by a hard-wired logic such as an ASIC (Application Specific Integrated Circuit) or an FPGA (Field Programmable Gate Array).

The reception unit 150a is a processing unit that receives various types of information from a terminal device on a network or the input unit 120. For example, When the text data 140a is received, the reception unit 150a stores the received text data 140a in the memory unit 140. When information of the search query 50a is received, the reception unit 150a outputs the information of the search query 50a to the first specification unit 150c.

The generation unit 150b is a processing unit that generates the first index 140c and the second index 140d based on the text data 140a. The generation unit 150b stores the generated first index 140c and second index 140d in the memory unit 140. The generation unit 150b also generates the compressed data 140e by compressing the text data 140a based on the dictionary information 140b. The generation unit 150b stores the generated compressed data 140e in the memory unit 140.

The generation unit 150b performs a morpheme analysis, a syntax analysis, and a semantic analysis with respect to the text data 140a, thereby specifying the attribute of words for respective words included in the text data 140a. The attribute of words includes "part of speech of words", "SVOC of words", and "dependency of words".

The generation unit 150b selects a word in the text data 140a and compares the selected word with the dictionary information 140b so as to specify a word ID. The generation unit 150b sets a flag "1" at a position in the first index 140c at which a row corresponding to the word ID intersects with a column corresponding to the offset of the selected word. Further, the generation unit 150b sets a flag "1" at respective positions in the second index 140d at which a row corresponding to the offset of the selected word intersects with the column of the part of speech of the selected word, the column of SVOC of the selected word, and the column of a relative offset of a word at the dependency destination of the selected word. The generation unit 150b does not set a flag in a column that does not correspond to any of these elements.

For example, it is assumed that "Micky" is located in the offset "1" in the text data 140a. In this case, the generation unit 150b sets a flag "1" at a position in the first index 140c at which the row 10a of the word ID "A001h" of the word "Micky" intersects with the column 10b of the offset "1".

For example, it is assumed that the word "Micky" being the part of speech "noun" is present in the offset "1" in the text data 140a. In this case, the generation unit 150b sets a flag "1" at a position at which the row 12a of the offset "1" in the second index 140d intersects with the column 13a corresponding to the part of speech "noun".

For example, it is assumed that the word "Micky" being the subject (S) is present in the offset "1" in the text data 140a. In this case, the generation unit 150b sets a flag "1" at a position at which the row 12a of the offset "1" in the second index 140d intersects with the column 13b corresponding to the subject (S).

For example, in the sentence "Micky eats cheese every day" in the text data 140a, when it is assumed that a word at the dependency source is "Micky (offset "1")" and a word at the dependency destination is "cheese", the relative offset becomes "2". In this case, the generation unit 150b sets a flag "1" at a position at which the row 12a of the offset "1" in the second index 140d intersects with the column 13c corresponding to the relative offset "2".

The generation unit 150b repeatedly executes the process described above with regard to other words in the text data 140a to repeatedly execute the process of setting a flag in the first index 140c and the second index 140d. The generation unit 150b can also execute a process of compressing the text data 140a into the compressed data 140e in parallel with the process described above.

The first specification unit 150c is a processing unit that specifies an offset of a word specified in the search query 50a based on the first index. The first specification unit 150c outputs the information of the specified offset of the word to the second specification unit 150d.

Upon reception of information of the search query 50a from the reception unit 150a, the first specification unit 150c compares a word specified in the search query 50a with the dictionary information 140b to specify a word ID. For example, when the word "Micky" is specified in the search query 50a, the first specification unit 150c acquires the word ID "A001h" by comparing the word "Micky" with the dictionary information 140b.

The first specification unit 150c compares a word ID with the first index 140c to specify the offset of a word. For example, the first specification unit 150c scans the row 10a of the word ID "A001h" (see FIG. 2 and the like) on the first index 140c to specify the location where the flag "1" is set. The information processing device specifies an offset corresponding to the location where the flag "1" is set as the offset of the word "Micky". When a plurality of words "Micky" are included in the text data 140a, offsets corresponding to the respective words "Micky" are specified respectively.

The second specification unit 150d is a processing unit that specifies attribute information of the word specified in the search query 50a based on the offset of the word specified in the search query 50a and the second index 140d. The second specification unit 150d outputs the information of the specified attribute to the notification unit 150e. When there are a plurality of offsets of words, the second specification unit 150d specifies attribute information of the words for each offset.

The second specification unit 150d scans the row of the offset of the word specified in the search query 50a in the second index 140d. When there is a location where the flag "1" is set in the portion 11a corresponding to the part of speech of words, the second specification unit 150d specifies a part of speech corresponding to the column in which the flag "1" is set as the part of speech corresponding to the specified word.

For example, in FIG. 4, when it is assumed that the row of the offset of the word specified in the search query 50a is a row 12a, a flag "1" is set in the column 13a corresponding to "noun". In this case, the second specification unit 150d specifies "noun" as the attribute of the word.

When there is a location where a flag "1" is set in the portion 11b corresponding to the SVOC of words, the second specification unit 150d specifies any of "S, V, O, C" corresponding to the column where the flag "1" is set as the SVOC corresponding to the word.

For example, in FIG. 4, when it is assumed that the row of the offset of the word specified in the search query 50a is the row 12a, the flag "1" is set in the column 13b corresponding to "S". In this case, the second specification unit 150d specifies "subject" as the attribute of the word.

When there is a location where the flag "1" is set in the portion 11c corresponding to the dependency of words, the second specification unit 150d specifies a relative offset corresponding to the row where the flag "1" is set.

For example, in FIG. 4, when it is assumed that the row of the offset of the word specified in the search query 50a is the row 12a, the flag "1" is set in the column 13c corresponding to "2". In this case, the second specification unit 150d specifies that the relative offset of the word as the dependency destination is "2". The second specification unit 150d can also specify the relative offset directly as the attribute of the word, or can also specify a pair of a word as the dependency source and a word as the dependency destination as the attribute of the word.

The second specification unit 150d detects a word located in the offset of the word specified in the search query 50a from the text data 140a and specifies the word as a word at the dependency source. The second specification unit 150d detects a word located in an added offset in which the offset of the word specified in the search query 50a and the specified relative offset are added together from the text data 140a and specifies the word as a word at the dependency destination.

The notification unit 150e is a processing unit that notifies the attribute information of the word specified by the second specification unit 150d to a terminal device being a transmission source of the search query 50a. When the search query 50a is input from the input unit 120, the notification unit 150e can display the attribute information of the word on the display unit 130.

Figure 5A:
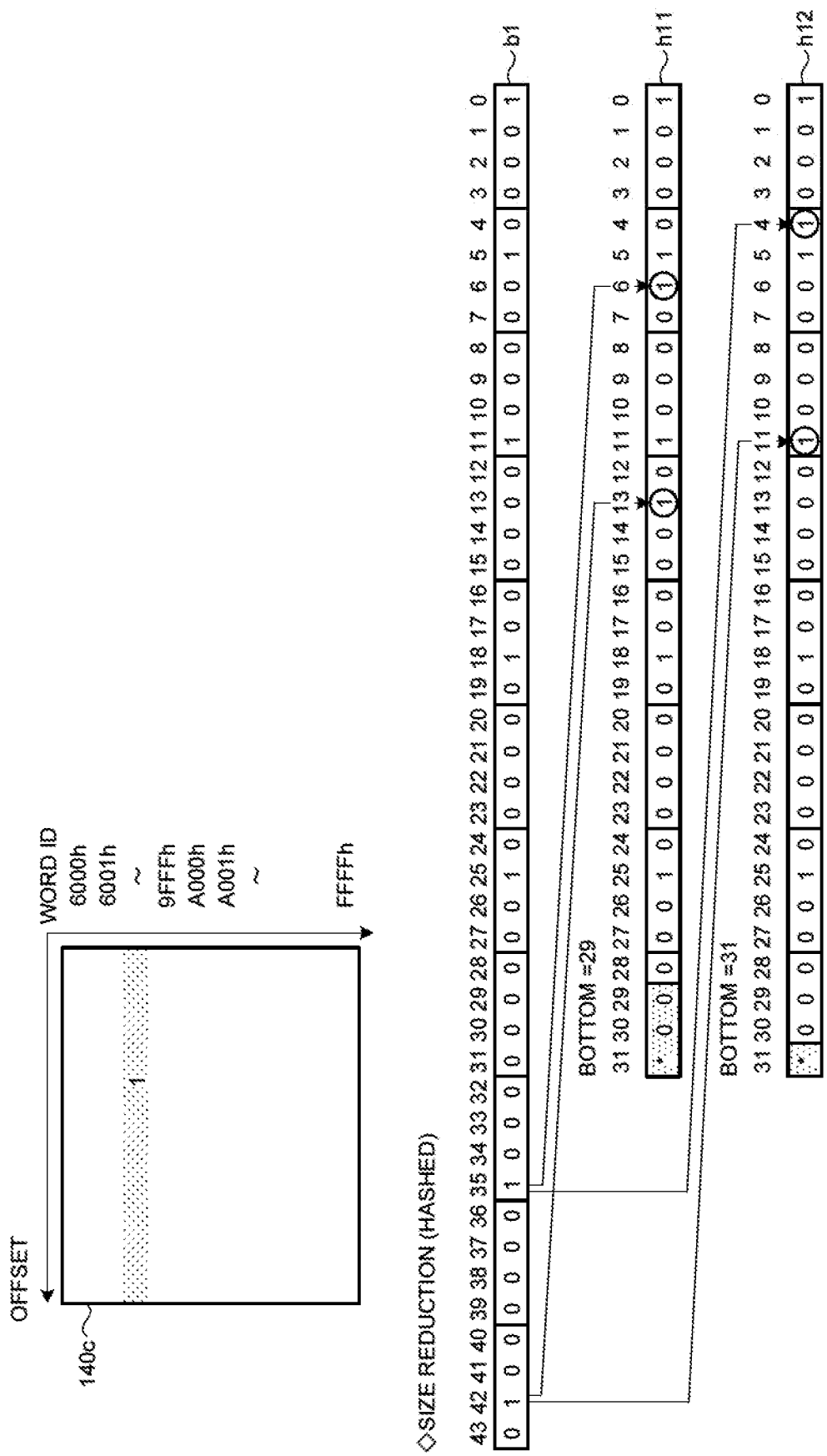
FIG. 5A is an explanatory diagram of an example of a process of reducing the size of a first index.

When the generation unit 150b has generated the first index 140c, the generation unit 150b can reduce the size thereof by hashing the first index 140c by an adjacent prime number (a bottom) by using a bitmap folding technique. FIG. 5A is an explanatory diagram of an example of a process of reducing the size of the first index.

A 32-bit register is assumed here and, as an example, respective bitmaps in the first index 140c are hashed based on prime numbers (bottoms) of 29 and 31. A case where a hashed bitmap h11 and a hashed bitmap h12 are generated from a bitmap b1 is described. It is assumed here that the bitmap b1 indicates a bitmap extracting a certain row in the first index 140c. The hashed bitmap h11 is a bitmap hashed by the bottom "29". The hashed bitmap h12 is a bitmap hashed by the bottom "31".

The generation unit 150b associates a value of the remainder obtained by dividing positions of respective bits in the bitmap b1 by one bottom with the position in the hashed bitmap. When "1" is set at the bit position in the corresponding bitmap b1, the generation unit 150b executes a process of setting "1" at the position in the associated hashed bitmap.

An example of a process of generating the hashed bitmap h11 with the bottom "29" from the bitmap b1 is described. First, the generation unit 150b copies information of positions "0 to 28" in the bitmap b1 to the hashed bitmap h11. Subsequently, because the remainder obtained by dividing a bit position "35" in the bitmap b1 by the bottom "29" is "6", the position "35" in the bitmap b1 is associated with a position "6" in the hashed bitmap h11. Because "1" is set at the position "35" in the bitmap b1, the generation unit 150b sets "1" at the position "6" in the hashed bitmap h11.

Because the remainder obtained by dividing a bit position "42" in the bitmap b1 by the bottom "29" is "13", the position "42" in the bitmap b1 is associated with a position "13" in the hashed bitmap h11. Because "1" is set at the position "42" in the bitmap b1, the generation unit 150b sets "1" at the position "13" in the hashed bitmap h11.

The generation unit 150b generates the hashed bitmap h11 by repeatedly executing the process described above with regard to positions higher than the position "29" in the bitmap b1.

An example of a process of generating a hashed bitmap h12 with the bottom "31" from the bitmap b1 is described. First, the generation unit 150b copies information of positions "0 to 30" in the bitmap b1 to the hashed bitmap h12. Subsequently, because the remainder obtained by dividing a bit position "35" in the bitmap b1 by the bottom "31" is "4", the position "35" in the bitmap b1 is associated with a position "4" in the hashed bitmap h12. Because "1" is set at the position "35" in the bitmap b1, the generation unit 150b sets "1" at the position "4" in the hashed bitmap h12.

Because the remainder obtained by dividing a bit position "42" in the bitmap b1 by the bottom "31" is "11", the position "42" in the bitmap b1 is associated with a position "11" in the hashed bitmap h12. Because "1" is set at the position "42" in the bitmap b1, the generation unit 150b sets "1" at the position "11" in the hashed bitmap h12.

The generation unit 150b generates the hashed bitmap h12 by repeatedly executing the process described above with regard to positions higher than the position "31" in the bitmap b1.

The generation unit 150b can reduce the data amount of the first index 140c by performing compression using the folding technique described above with respect to respective rows in the first index 140c. It is assumed here that the hashed bitmaps with the bottoms "29" and "31" are added with information of the row (word ID) in the bitmap at a generation source and are stored in the memory unit 140.

Figure 5B:
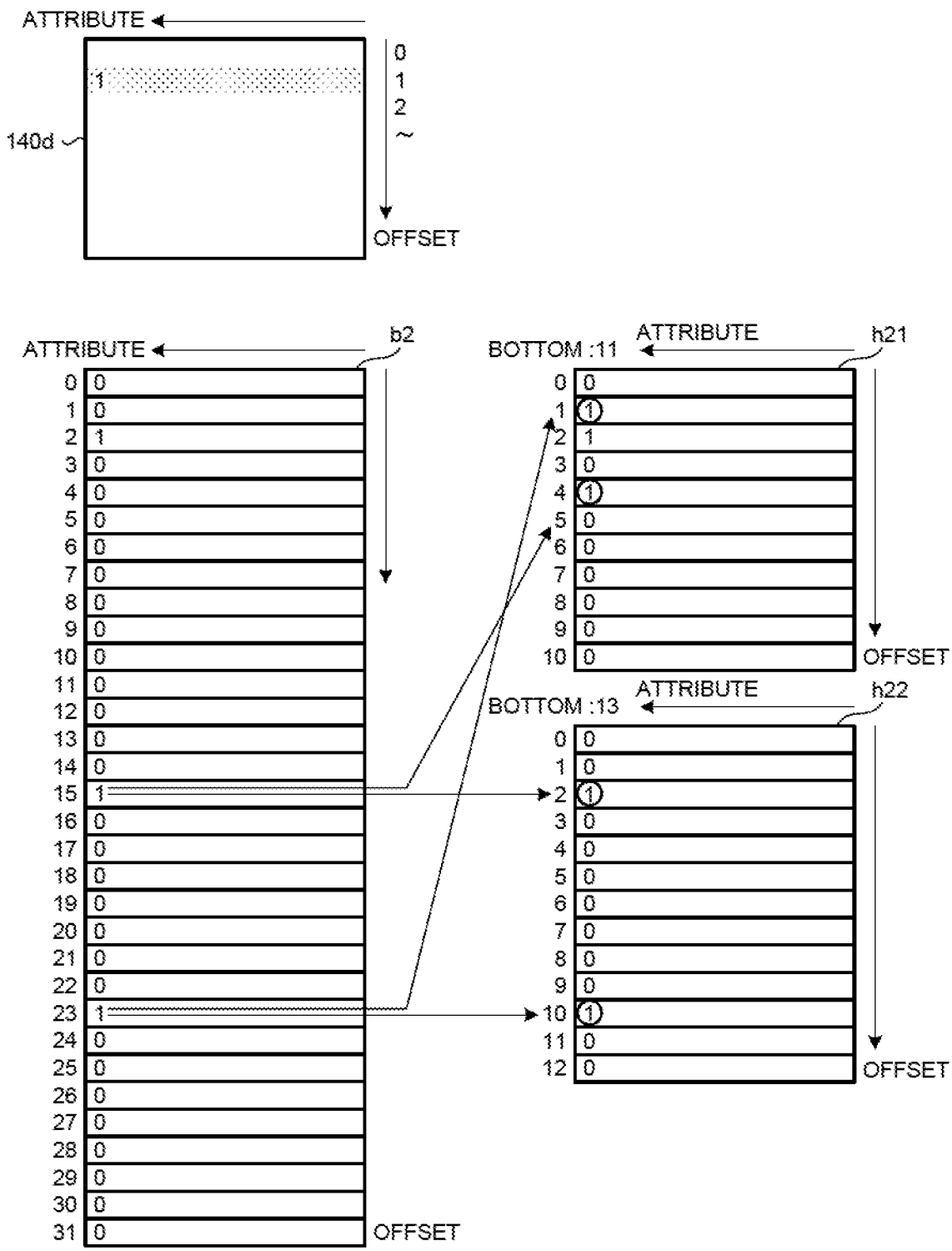
FIG. 5B is an explanatory diagram of an example of a process of reducing the size of a second index.

When generating the second index 140d, the generation unit 150b can reduce the size thereof by hashing the second index 140d by an adjacent prime number (a bottom) by using the bitmap folding technique. FIG. 5B is an explanatory diagram of an example of a process of reducing the size of the second index.

As an example, the respective bitmaps in the second index 140d are hashed based on prime numbers (bottoms) of 11 and 13. A case where a hashed bitmap h21 and a hashed bitmap h22 are generated from a bitmap b2 is described. It is assumed here that the bitmap b22 indicates a bitmap extracting a certain row in the second index 140d. The hashed bitmap h21 is a bitmap hashed by the bottom "11". The hashed bitmap h22 is a bitmap hashed by the bottom "13".

The generation unit 150b associates the value of a remainder obtained by dividing positions of respective bits in the bitmap b2 by one bottom with the position in the hashed bitmap. When "1" is set at the bit position in the corresponding bitmap b2, the generation unit 150b executes a process of setting "1" at the position in the associated hashed bitmap.

An example of a process of generating the hashed bitmap h21 with the bottom "11" from the bitmap b2 is described. First, the generation unit 150b copies information of positions "0 to 10" in the bitmap b2 in the hashed bitmap h21. Subsequently, because the remainder obtained by dividing a bit position "15" in the bitmap b2 by the bottom "11" is "4", the position "15" in the bitmap 2 is associated with a position "4" in the hashed bitmap h21. Because "1" is set at the position "15" in the bitmap b2, the generation unit 150b sets "1" at the position "4" in the hashed bitmap h21.

The generation unit 150b generates the hashed bitmap h21 by repeatedly executing the process described above with regard to positions higher than the position "15" in the bitmap b2.

An example of a process of generating a hashed bitmap h22 with the bottom "13" from the bitmap b2 is described. First, the generation unit 150b copies information of positions "0 to 12" in the bitmap b2 to the hashed bitmap h22. Subsequently, because the remainder obtained by dividing a bit position "15" in the bitmap b2 by the bottom "13" is "2", the position "15" in the bitmap b2 is associated with a position "2" in the hashed bitmap h22. Because "1" is set at the position "15" in the bitmap b2, the generation unit 150b sets "1" at the position "2" in the hashed bitmap h22.

The generation unit 150b generates the hashed bitmap h22 by repeatedly executing the process described above with regard to positions higher than the position "15" in the bitmap b2.

The generation unit 150b can reduce the data amount of the second index 140d by performing compression using the folding technique described above with regard to respective rows in the second index 140d. It is assumed here that the hashed bitmaps with the bottoms "11" and "13" are added with information of the row (offset) in the bitmap at a generation source and are stored in the memory unit 140.

When the first index 140c is hashed by the folding technique, the first specification unit 150c reads out a hashed bitmap corresponding to a word ID, and after restoring a word, the first specification unit 150c executes a process of specifying the offset of the word.

Figure 6A:
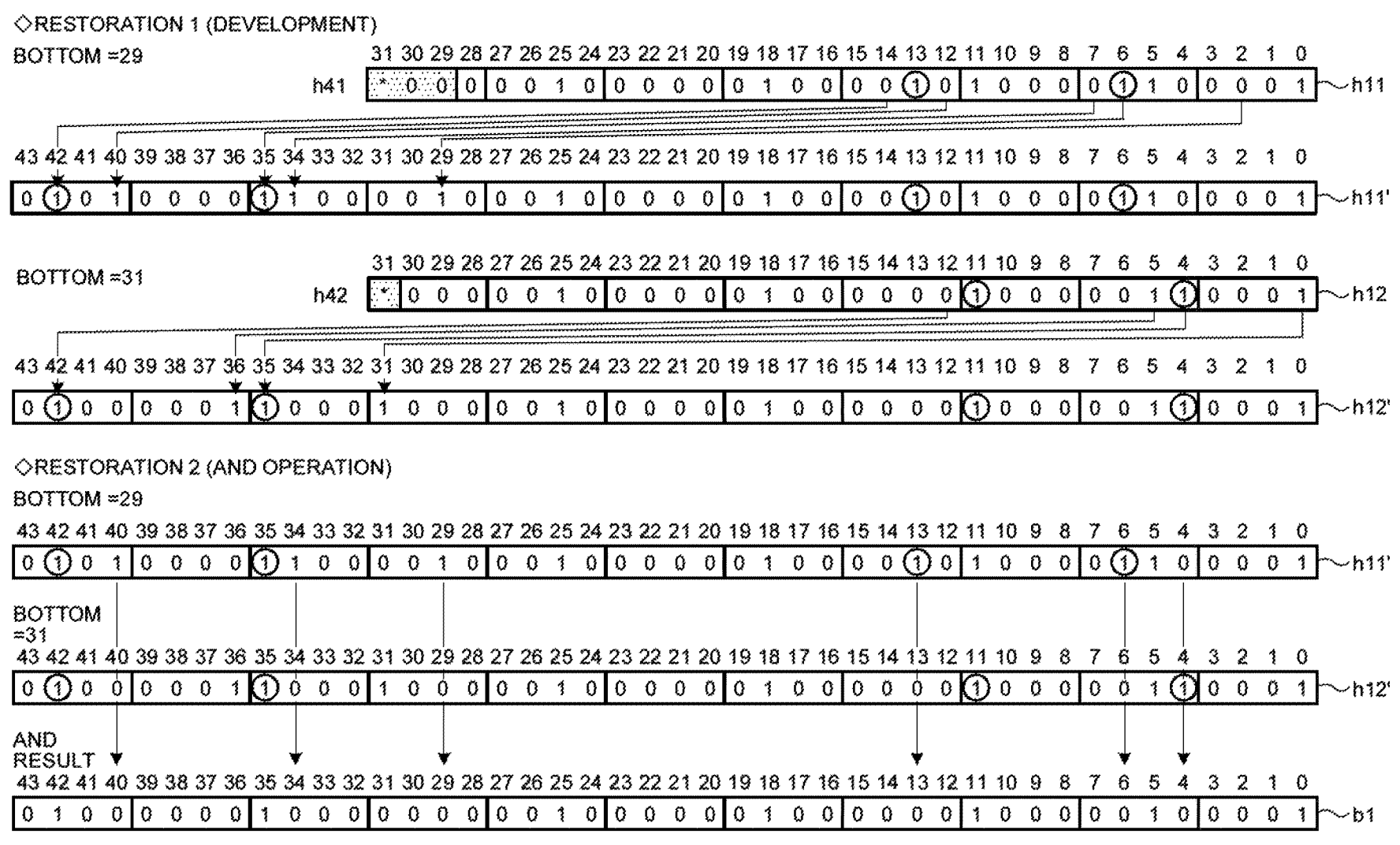

FIG. 6A is an explanatory diagram of an example of a process of restoring the first index. An example in which the first specification unit 150c restores the bitmap b1 based on the hashed bitmap h11 and the hashed bitmap h12 is described here.

The first specification unit 150c generates an intermediate bitmap h11' from the hashed bitmap h11 with the bottom "29". The first specification unit 150c copies values at the positions 0 to 28 in the hashed bitmap h11 in positions 0 to 28 in the intermediate bitmap h11' respectively.

The first specification unit 150c repeatedly executes the process of respectively copying the values at the positions 0 to 28 in the hashed bitmap h11 for every "29" with regard to the values after the position 29 in the intermediate bitmap h11'. In the example illustrated in FIG. 6A, there is illustrated an example in which values at the positions 0 to 14 in the hashed bitmap h11 are copied in positions 29 to 43 in the intermediate bitmap h11'.

The first specification unit 150c generates an intermediate bitmap h12' from the hashed bitmap h12 with a bottom "31". The first specification unit 150c respectively copies values at positions 0 to 30 in the hashed bitmap h12 in positions 0 to 30 in the intermediate bitmap h12'.

With regard to the values after the position 31 in the intermediate bitmap h12', the first specification unit 150c repeatedly executes the process of respectively copying values at the positions 0 to 30 in the hashed bitmap h12 for every "31". In the example illustrated in FIG. 6A, there is illustrated an example in which the values at the positions 0 to 12 in the hashed bitmap h12 are copied in positions 31 to 43 in the intermediate bitmap h12'.

After generating the intermediate bitmap h11' and the intermediate bitmap h12', the first specification unit 150c performs an AND operation of the intermediate bitmap h11' and the intermediate bitmap h12' to restore the bitmap b1 before being hashed. The first specification unit 150c can restore the bitmap corresponding to the word ID by repeatedly executing similar processes with regard to other hashed bitmaps.

When the second index 140d is hashed by the folding technique, the second specification unit 150d reads out a hashed bitmap corresponding to an offset, and after restoring the bitmap, the second specification unit 150d executes a process of specifying an attribute corresponding to the offset.

FIG. 6B is an explanatory diagram of an example of a process of restoring the second index. As an example, a case where the second specification unit 150d restores the bitmap b2 based on the hashed bitmap h21 and the hashed bitmap h22 is described here.

The second specification unit 150d generates an intermediate bitmap h21' from the hashed bitmap h21 with a bottom "11". The second specification unit 150d respectively copies values at positions 0 to 10 in the hashed bitmap h21 in positions 0 to 10 in the intermediate bitmap h21'.

With regard to the values after the position 11 in the intermediate bitmap h21', the second specification unit 150d repeatedly executes the process of respectively copying values at the positions 0 to 10 in the hashed bitmap h21 for every "11". In the example illustrated in FIG. 6B, there is illustrated an example in which the values at positions 0 to 10 in the hashed bitmap h21 are copied in positions 11 to 21 in the intermediate bitmap h21', and the values at positions 0 to 9 in the hashed bitmap h21 are copied in positions 22 to 31 in the intermediate bitmap h21'.

The second specification unit 150d generates an intermediate bitmap h22' from the hashed bitmap h22 with a bottom "13". The second specification unit 150d respectively copies values at positions 0 to 12 in the hashed bitmap h22 in positions 0 to 12 in the intermediate bitmap h22'.

With regard to the values after the position 13 in the intermediate bitmap h22', the second specification unit 150d repeatedly executes the process of respectively copying the values at the positions 0 to 12 in the hashed bitmap h22 for every "13". In the example illustrated in FIG. 6B, there is illustrated an example in which the values at positions 0 to 12 in the hashed bitmap h22 are copied in positions 13 to 25 in the intermediate bitmap h22', and the values at positions 0 to 5 in the hashed bitmap h22 are copied to positions 26 to 31 in the intermediate bitmap h22'.

After generating the intermediate bitmap h21' and the intermediate bitmap h22', the second specification unit 150d performs an AND operation of the intermediate bitmap h21' and the intermediate bitmap h22' to restore the bitmap b2 before being hashed. The second specification unit 150d can restore the bitmap corresponding to the offset by repeatedly executing similar processes with regard to other hashed bitmaps.

Figure 7:
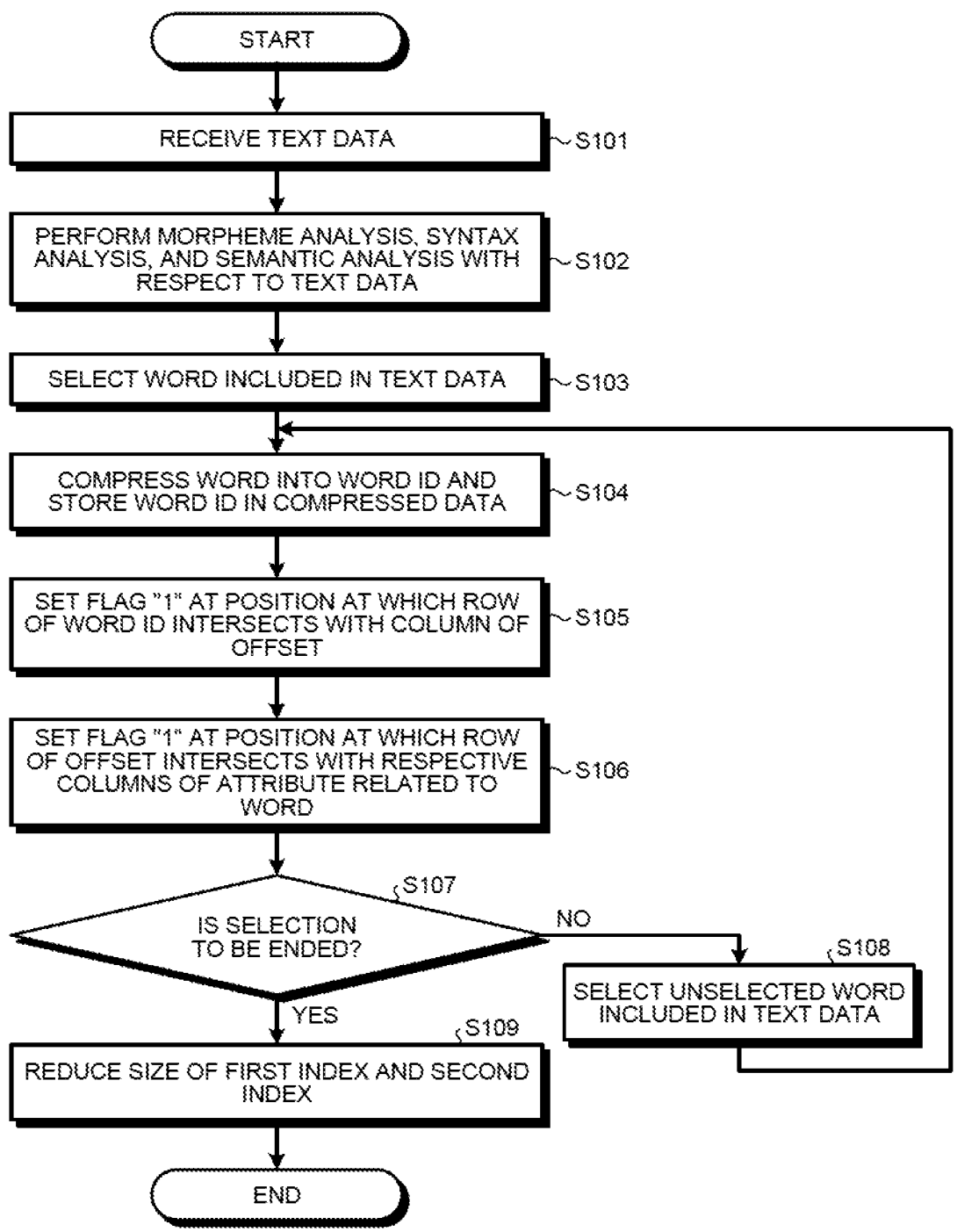
FIG. 7 is a flowchart illustrating a process of generating the first index and the second index.

Next, an example of a process procedure of the information processing device 100 according to the present embodiment is described. FIG. 7 is a flowchart illustrating a process of generating the first index and the second index. As illustrated in FIG. 7, the reception unit 150a of the information processing device 100 receives text data 140a (Step S101).

The generation unit 150b of the information processing device 100 performs a morpheme analysis, a syntax analysis, and a semantic analysis with respect to the text data 140a (Step S102). The generation unit 150b selects a word included in the text data 140a (Step S103). The generation unit 150b compresses a word into a word ID and stores the word ID in the compressed data 140e (Step S104).

The generation unit 150b sets a flag "1" at a position in the first index 140c at which a row of the word ID of the selected word intersects with a column of an offset of the selected word (Step S105). The generation unit 150b sets a flag "1" at respective positions in the second index at which the offset of the selected word intersects with respective columns of the attribute related to the selected word (Step S106).

When selection of words is to be ended (YES at Step S107), the generation unit 150b hashes the first index 140c and the second index 140d by an adjacent prime number to reduce the size thereof (Step S109), and ends the process of generating the index. On the other hand, when selection of words is not to be ended (NO at Step S107), the generation unit 150b selects an unselected word included in the text data 140a (Step S108), and proceeds to Step S104.

Figure 8:
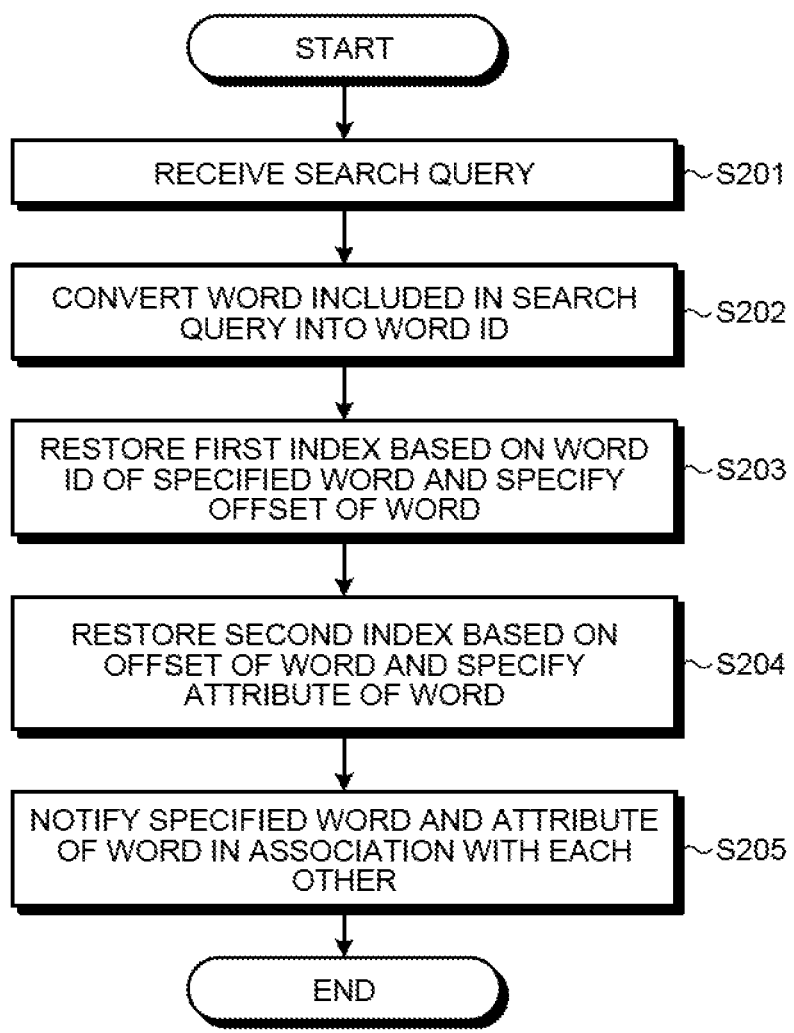
FIG. 8 is a flowchart illustrating a process of specifying the attribute of a word based on a search query.

FIG. 8 is a flowchart illustrating a process of specifying the attribute of a word based on a search query. As illustrated in FIG. 8, the reception unit 150a of the information processing device 100 receives a search query (Step S201). The first specification unit 150c of the information processing device 100 converts a word included in the search query into a word ID (Step S202).

The first specification unit 150c restores the first index 140c based on the word ID of the word specified in the search query and specifies an offset of the word (Step S203). The second specification unit 150d of the information processing device 100 restores the second index 140d based on the offset of the word specified by the first specification unit 150c and specifies the attribute of the word (Step S204).

The notification unit 150e of the information processing device 100 notifies the word specified in the search query and the attribute of the word in association with each other (Step S205).

The effects of the information processing device 100 according to the present embodiment are described next. When a word is specified by a search query, the information processing device 100 specifies an offset of the specified word based on the word ID of the word and the first index. The information processing device 100 specifies the attribute corresponding to the offset of the word based on the offset of the specified word and the second index. In this manner, by using the first index 140c and the second index 140d, the attribute of the word included in the text data 140a can be specified at a high speed.

The attribute of the word specified by the information processing device 100 includes "part of speech of words", "SVOC of words", and "dependency of words". Therefore, by specifying a word by a search query, the relationship among the part of speech of the specified word, an element of a sentence, and the dependency can be specified.

The information processing device 100 performs a morpheme analysis, a syntax analysis, and a semantic analysis with respect to the text data 140a to specify the word at the dependency source and the word at the dependency destination included in text data, and generates a second index in which the word at the dependency source and a relative offset of the word at the dependency destination are associated with each other. Further, the information processing device 100 generates the first index in which the word at the dependency source and an offset of the word at the dependency source are associated with each other. With these processes, the pieces of information on the first index 140c and the second index 140d to be used for specifying the attribute (dependency relationship) of words included in the text data 140a can be generated.

Next, an example of a hardware configuration of a computer that realizes functions identical to those of the information processing device 100 illustrated in the embodiment described above is described. FIG. 9 is a diagram illustrating an example of a hardware configuration of a computer that realizes functions identical to those of the information processing device 100.

As illustrated in FIG. 9, a computer 200 includes a CPU 201 that executes various types of arithmetic processing, an input device 202 that receives an input of data from a user, and a display 203. The computer 200 further includes a reader 204 that reads programs and the like from a storage medium, and an interface device 205 that performs transmission and reception of data with other devices via a wired or wireless network. The computer 200 also includes a RAM 206 that temporarily memorizes therein various types of information and a hard disk device 207. The respective devices 201 to 207 are connected to a bus 208.

The hard disk device 207 includes a reception program 207a, a generation program 207b, a first specification program 207c, a second specification program 207d, and a notification program 207e. The hard disk device 207 reads out the respective programs 207a to 207e and loads these programs in the RAM 206.

The reception program 207a functions as a reception process 206a. The generation program 207b functions as a generation process 206b. The first specification program 207c functions as a first specification process 206c. The second specification program 207d functions as a second specification process 206d. The notification program 207e functions as a notification process 206e.

The process of the reception process 206a corresponds to the process executed by the reception unit 150a. The process of the generation process 206b corresponds to the process executed by the generation unit 150b. The process of the first specification process 206c corresponds to the process executed by the first specification unit 150c. The process of the second specification process 206d corresponds to the process executed by the second specification unit 150d. The process of the notification process 206e corresponds to the process executed by the notification unit 150e.

As for the respective programs 207a to 207e, these programs do not need to be memorized in the hard disk device 207 in advance. For example, these programs are memorized in a "portable physical medium" such as a flexible disk (FD), a CD-ROM, a DVD, a magneto-optical disk, and an IC card that are inserted in the computer 200. It is possible to configure that the computer 200 reads out and executes the respective programs 207a to 207e.

It is possible to accelerate a process of specifying the attribute of a word included in text data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An identification method comprising:
   receiving a specification of a word, using a processor; and
   specifying an attribute of the specified word at an appearance position in text data that is indicated by an offset starting from a top word included in the text data, by referring to a memory unit that memorizes therein attributes at appearance positions in the text data of respective words included in the text data, where the attributes are associated with the appearance positions and the words, the attribute being an appearance position of another word having a specific relationship with the specified word among words included in the text data, using the processor.

2. The identification method according to claim 1, wherein the relationship is a dependency relationship.

3. The identification method according to claim 1, wherein the attribute is a part of speech of the word.

4. The identification method according to claim 1, wherein the attribute is information indicating to which element among elements of a sentence included in the text data the word corresponds.

5. An identification method comprising:
   receiving text data, using a processor;
   specifying a first word included in the text data and a second word having a specific relationship with the first word respectively by analyzing the received text data, using the processor;
   first generating first information in which an appearance position of the first word included in the text data is associated with an appearance position of the second word based on the appearance position of the first word, a part of speech of the first word, and an element of a sentence corresponding to the first word with each other, the appearance position in text data being indicated by an offset starting from a top word included in the text data, using the processor; and
   second generating second information in which the first word and the appearance position of the first word are associated with each other, using the processor.

6. The identification method according to claim 5, wherein the first information is a bitmap in which 0 and 1 are arranged, and the process further comprises hashing the bitmap based on a predetermined prime number.

7. The identification method according to claim 5, wherein the second information is a bitmap in which 0 and 1 are arranged, and the process further comprises hashing the bitmap based on a predetermined prime number.

8. An information processing device comprising:
   a processor that executes a process comprising:

receiving a specification of a word; and specifying an attribute of the specified word at an appearance position in text data that is indicated by an offset starting from a top word included in the text data, by referring to a memory unit that memorizes therein attributes at appearance positions in the text data of respective words included in the text data, where the attributes are associated with the appearance positions and the words, the attribute being an appearance position of another word having a specific relationship with the specified word among words included in the text data.

9. The information processing device according to claim 8, wherein the relationship is a dependency relationship.

10. The information processing device according to claim 8, wherein the attribute is a part of speech of the word.

11. The information processing device according to claim 8, wherein the attribute is information indicating to which element among elements of a sentence included in the text data the word corresponds.

12. An information processing device comprising:
a processor that executes a process comprising:
receiving text data;
specifying a first word included in the text data and a second word having a specific relationship with the first word respectively by analyzing the received text data;
first generating first information in which an appearance position of the first word included in the text data is associated with an appearance position of the second word based on the appearance position of the first word, a part of speech of the first word, and an element of a sentence corresponding to the first word with each other, the appearance position in text data being indicated by an offset starting from a top word included in the text data; and
second generating second information in which the first word and the appearance position of the first word are associated with each other.

13. The information processing device according to claim 12, wherein the first information is a bitmap in which 0 and 1 are arranged, and the process further comprises hashing the bitmap based on a predetermined prime number.

14. The information processing device according to claim 12, wherein the second information is a bitmap in which 0 and 1 are arranged, and the process further comprises hashing the bitmap based on a predetermined prime number.

* * * * *